United States Patent [19]

Sibley

[11] 4,029,274

[45] June 14, 1977

[54] TRAIN CONTROL SIGNALLING SYSTEM

[75] Inventor: Henry C. Sibley, Adams Basin, N.Y.

[73] Assignee: General Signal Corporation, Rochester, N.Y.

[22] Filed: Apr. 12, 1976

[21] Appl. No.: 676,079

[52] U.S. Cl. .................... 246/187 B; 235/92 EC; 235/153 AP; 246/63 R; 340/146.1 AB; 340/168 R

[51] Int. Cl.² .................................. B61L 23/16

[58] Field of Search ...... 235/92 FQ, 92 CC, 92 EC, 235/150.24, 153 AB; 246/5, 63 R, 63 C, 167 R, 175, 187 B; 340/146.1 AB, 168 R, 23, 171 R

[56] References Cited

UNITED STATES PATENTS

| | | | |
|---|---|---|---|
| 3,639,740 | 1/1972 | Escoffier et al. | 235/153 AP |
| 3,748,466 | 7/1973 | Sibley et al. | 246/63 C |
| 3,949,199 | 4/1976 | Odom | 235/92 CC X |

Primary Examiner—Stephen G. Kunin
Attorney, Agent, or Firm—Milton E. Kleinman; George W. Killian

[57] ABSTRACT

In a train control signalling system, a wayside signal of an unknown code rate is detected and decoded on board the train to determine the code rate and derive the coded train control intelligence. The code rate is determined by counting the number of cycles of a known higher frequency which occur during one period of the unknown code rate. Before a train command signal is issued, a number of tests are performed to verify that the determination is accurate with no margin for error. The known higher frequency signal is passed through a tuned circuit to verify that it is within predetermined limits of its rated frequency. The counter that counts the cycles of the known higher frequency is tested to verify that it is reset to zero at required intervals. Verification is obtained that one and only one train control signal is obtained. The counting circuits and memory devices are cycled prior to each decoding operation to verify proper functioning. Each train control circuit is tested and none can operate unless the prior one in the chain responded properly. A train control circuit cannot remain operated unless it receives periodic confirmation signals.

25 Claims, 6 Drawing Figures

TRAIN CONTROL SIGNALLING SYSTEM

CROSS REFERENCE TO RELATED APPLICATION

The application entitled "Vital Relay Operating Circuit," assigned to the assignee of the present application by the inventors, Henry C. Sibley and John H. Auer, Jr., filed on Aug. 21, 1975, and given Ser. No. 606,695 is not directly related to this application, but does give some general information about vital relays, their characteristics and operation. The circuit of the present application is designed to actuate a vital relay and, therefore, the information provided about vital relays in the cited co-pending application may provide useful background information.

BACKGROUND OF THE INVENTION

In certain types of signalling systems, including systems on board trains, it is desirable to be able to detect a signal from a wayside station, determine its code rate, and execute an action responsive to the information indicated by the detected rate. For example, in a railway system, it is common to apply a coded a.c. signal to the track and have the signal picked up and decoded by equipment on board the train to indicate desired operating speeds. Thus, a detected signal at or near a first predetermined code rate might indicate that the train speed should be within a predetermined range, while a detected signal at or near a second code rate would indicate a different speed range. Various other types of intelligence could be carried by the coded signal. The coded signal may comprise an a.c. signal of constant frequency turned on and off at a predetermined rate for a particular code. To transmit some other code, information, or intelligence, the constant a.c. frequency would be turned on and off at a different rate. Obviously, only one coded signal could be applied to the track at any given time.

In the prior art, the coded track signals were typically detected by filters and/or tuned circuits. Such systems have been employed successfully for many years. However, the necessary filters and/or tuned circuits tend to be both bulky and expensive. Accordingly, more economical and compact equipment is disclosed herewith for detecting, decoding and responding to the coded track signal.

SUMMARY OF THE INVENTION

The present invention provides means for actuating one of a plurality of vital relays with an assurance that only one of the vital relays can be actuated in response to the detection of a coded a.c. track signal.

The code rate is determined by counting the number of cycles of a much higher frequency signal which occur during one on-off cycle of the signal. Elapsed time memory devices comprising flip flop circuits indicative of predetermined magnitudes of the number of high frequency pulses counted are sequentially set. The particular flip flop which is set at the end of one cycle of the track signal is indicative of the code rate of the applied track signal. After selected tests, the appropriate vital relay is actuated.

Before actuation of the vital relays, tests are made to ascertain that each memory device prior to the final one was sequentially actuated and that at the end, all prior and subsequent memory devices are reset. A test is made to determine that the counter has been reset to zero to prepare it for counting the number of high frequency pulses during the next off-on cycle of the track signal. A test is made to determine that the frequency of the high frequency signal is the intended frequency. Another test is made to determine that all memory devices were reset.

The vital relay is actuated only if favorable results are received from all tests. Solid state circuits including a variety of gates, amplifiers and inverters are used to form counters, flip flops and related circuits to perform the desired tests.

The vital relay of the structure can remain operated only if the vital relay driver receives intermittent pulses of energy which vary in polarity and which occur within predetermined time limits. That is, a vital relay can remain operated only in response to affirmative signals indicating that it should remain operated. Any cessation of affirmative signals will result in release of the vital relay. The present circuit determines that affirmative signals are applied only to the desired vital relay and only when the entire system is performing accurately.

It is an object of the present invention to selectively actuate one of a plurality of vital relays.

It is a more specific object of the invention to actuate a selected vital relay which corresponds to a decoded track signal.

It is a more specific object of the invention to detect a code signal, determine its period and operate a vital relay indicative of the period.

It is a more specific object of the invention to provide digital means for determining the code rate of a track signal and for actuating an appropriate vital relay in response to the determined code rate of the track signal.

It is another object of the invention to guard against actuation of an unauthorized vital relay.

It is another object of the invention to prevent actuation of the vital relay until there is an affirmative indication that the overall system is functioning properly.

BRIEF DESCRIPTION OF THE DRAWING

The circuit of the invention is illustrated in various figures in which electrical components are illustrated with standard symbols and/or whose function is indicated in words. In some cases, to simplify the drawing, two or more wires may be indicated by a single line.

The system operation may be more readily apparent when FIGS. 1 through 5 are arranged in the manner illustrated in FIG. 6.

For convenience, leads which extend from one figure to another have, for the most part, been given a series of identification letters which, in abbreviated form, are indicative of the character of the information transmitted on that lead.

Considering now more specifically the individual figures, it will be seen that;

DESCRIPTION OF THE PREFERRED EMBODIMENT

Figures 1, 6:
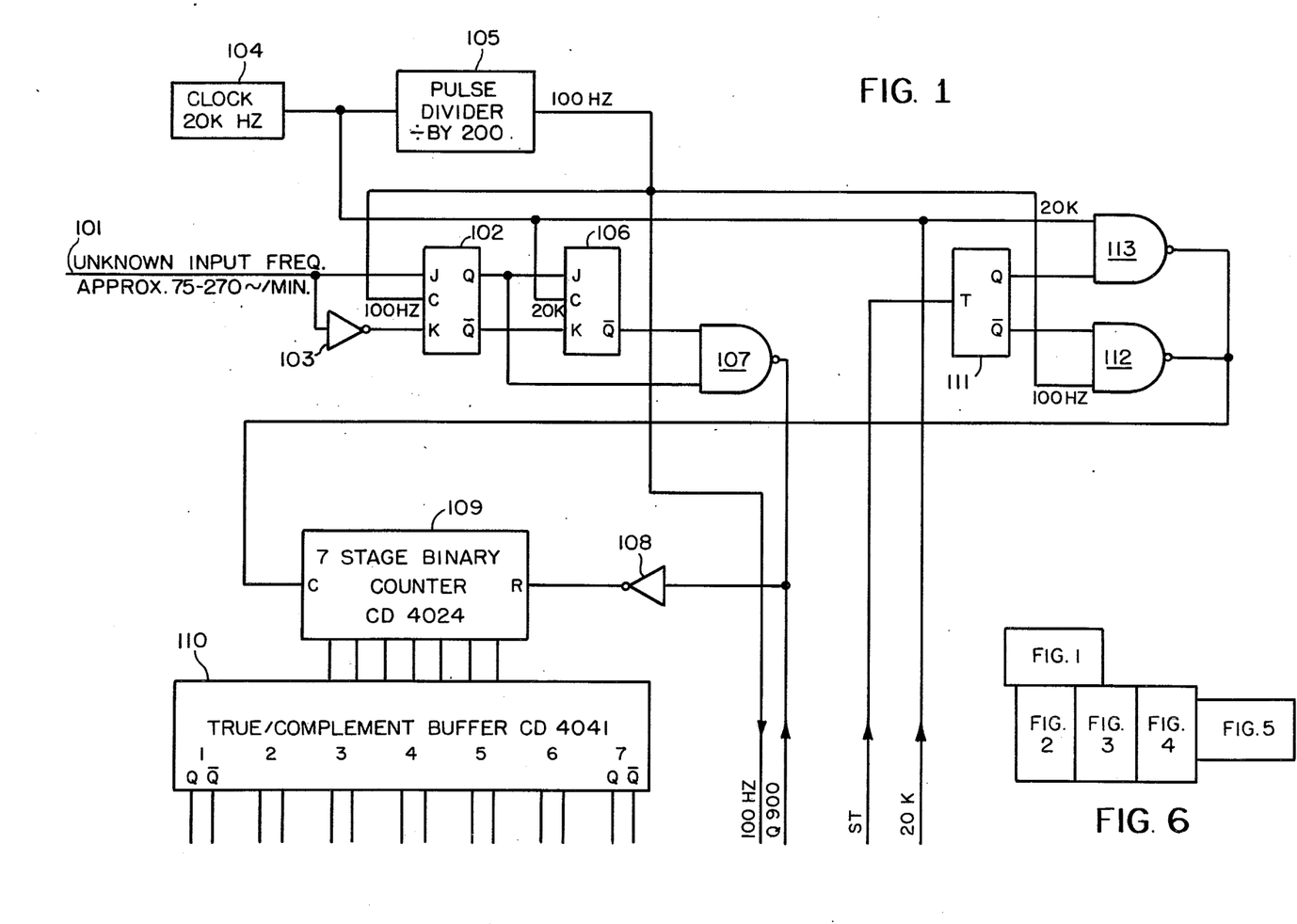
FIG. 1 comprises a binary counter, together with a plurality of other circuit elements and a source of clock pulses for providing counting pulses to FIG. 2 and receiving and transmitting other control signals to FIG. 2.
FIG. 6 illustrates how the FIGS. 1 through 5 should be arranged to illustrate the circuit of the invention.
Figure 2:
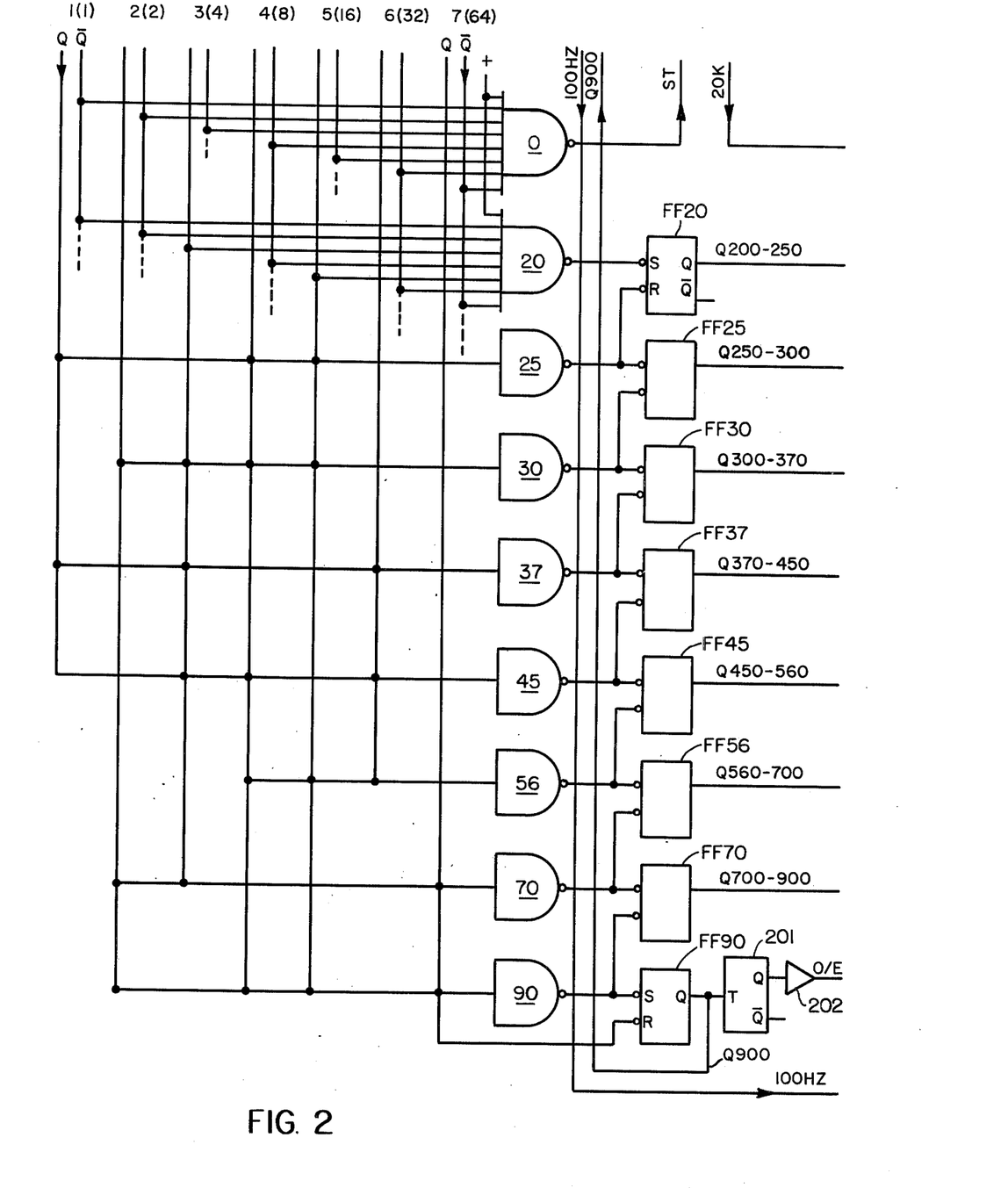
FIG. 2 comprises a series of gates for gating selected pulses to set and reset a series of flip flops which serve as memory devices.

The following superficial summary of the operation of the overall system and train control circuit is provided to give an overview. A coded signal of unknown, but relatively low code rate causes a binary counter to be reset at the start of a cycle of the unknown code rate. A clock pulse of 20K Hz is divided to 100 Hz signals and the counter is driven at 100 Hz. The binary output of the counter is gated through a plurality of AND gates so that at predetermined counts a series of memory devices comprising flip flops are sequentially set and reset. Because the 100 Hz signal has a known period of 10 milliseconds, the flip flop which is set at the end of the code rate cycle is indicative of the code rate, and hence indicative of the coded intelligence. The output of the flip flop circuits of FIG. 2 controls the AND gates of FIG. 3 which gate control signals to FIG. 4 and an appropriate FIG. 5 circuit. Tests are made to determine that all flip flops, both prior and subsequent to the one that caused the signal to actuate one of the circuits of FIG. 5, were reset. The tuned circuit and associated elements at the bottom of FIG. 3, test the frequency of the 100 Hz signal and provides a pass signal if the frequency is within a predetermined range. At the end of the code rate cycle of the input signal, a toggle flip flop, in FIG. 1, is toggled and 20K Hz pulses are applied to the counter to reset all flip flops. At the count of 90, the counter is reset and the toggle actuated to cause the counter to start counting the 100 Hz cycles again. In the next cycle of operation, the toggle flip flop, at the bottom of FIG. 2, is actuated and provides a signal to FIG. 5 to cause first one and then the other winding of the vital relay to be energized.

Considering now more specifically the detailed operation of the circuit, there will be seen in FIG. 1 a lead 101 to which an unknown input frequency, or more accurately, the coded signal, having an unknown code rate of approximately 75 to 270 cycles per minute is applied. Circuit means for detecting a wayside signal and applying it to an onboard lead, such as 101, are well known in the art and are not shown herein. As will be seen, the coded signal placed on lead 101 is applied to the J input of the JK flip flop 102. The input also passes through inverter 103 and is applied to the K input of the JK flip flop 102. A source 104 of clock pulses delivers pulses at a 20K Hz rate. The 20K Hz pulses are applied to pulse divider 105 and the 100 Hz output is applied to the clock pulse C of the JK flip flop 102. Accordingly, in response to the first 100 Hz pulse, subsequent to the start of a cycle of the unknown code rate, output pulses will appear on the Q and $\overline{Q}$ terminals of the JK flip flop 102. The output of the JK flip flop 102 conditions the JK flip flop 106 and the next 20K Hz clock pulse is applied to the JK flip flop 106 to cause a signal to pass through the AND gate 107 and the inverter 108 to reset the seven stage binary counter 109. The seven stage binary counter 109 may comprise a digital integrated circuit such as the RCA element CD4024. The output of the seven stage counter 109 drives the true/compliment buffer 110 which may comprise a digital integrated circuit such as RCA element CD4041. The JK flip flops 102 and 106 may comprise RCA integrated circuits CD4095.

In a standard and well known manner, the true/compliment buffer 110 will respond to successive input signals to produce output signals such that if the seven output leads are given weighted values of 1, 2, 4, 8, 16 and 32, the sum of the weighted values of the leads having output signals will equal the sum of the input pulses.

For the moment, it will be assumed that the toggle flip flop 11 has been conditioned to enable AND gate 112 such that 100 Hz pulses from the pulse divider 105 may pass through AND gate 112 to the counter input C of the seven stage counter 109. It will be observed that if the toggle flip flop 111 enabled the AND gate 113, clock pulses of 20K Hz will be gated through AND gate 113 to drive the seven stage counter 109. The use and function of the fast drive of the counter will be described hereinafter.

The output of the true/compliment buffer 110 comprises seven pairs of output leads with a Q and $\overline{Q}$ lead in each pair. For convenience in analysis, the pairs of leads are given Q and $\overline{Q}$ designations and numbers in parenthesis which indicate the weighted value of the lead. FIG. 2 includes nine AND gates, each of which has eight input leads. The AND gates are designated 0, 20, 25, 30, 37, 45, 56, 70 and 90. As will be seen, the designation of these AND gates corresponds to the decimal equivalent of the binary code that may be gated therethrough. That is, for example, when the binary output code on the Q leads of the true/compliment buffer 110 equals 45, a pulse may be passed through AND gate 45. Each of the AND gates 0, 20, 25, 30, 37, 45, 56, 70 and 90 have eight inputs; one of which is connected to positive potential. The other seven are selectively connected to one or the other of each of the seven pairs of output leads from the true/-compliment buffer 110. The 0 AND gate has its seven input leads (other than the one connected to positive potential) coupled to the seven $\overline{Q}$ output signals of the true/compliment buffer 110. Accordingly, with a binary output of zero, a pulse will be passed through AND gate 0. The inputs of the AND gate 20 are coupled to the Q16 and Q4 leads and all other $\overline{Q}$ leads. Accordingly, the AND gate 20 will pass a signal when the output of the true/compliment buffer 110 equals 20.

In order to simplify the circuit illustrated in FIG. 2, the inputs of the remaining AND gates are shown in FIG. 2 are abbreviated as a single line, which is shown as coupled to the appropriate Q outputs of the true/-compliment buffer 110. It should be understood that the other inputs of the gates of FIG. 2 are coupled to the $\overline{Q}$ leads of the true/compliment buffer 110. Such connections are standard in the digital art and, therefore, are shøwn herein in abbreviated form for convenience.

Each of the AND gates 20, 25, etc. has an associated flip flop FF20, FF25, FF30, FF37, FF45, FF56, FF70 and FF90. Accordingly, an output through one of the AND gates 20 to 90 will set its associated flip flop. As one flip flop is set, it will be seen that, simultaneously, the preceding flip flop is reset. Therefore, only one flip flop should be set at any one time. It will be seen that both the set and reset terminals of flip flop FF90 are controlled by the Q64 lead. It will be seen that the output of the AND gates 20 through 90 are inverted and, therefore, the flip flop FF90 will be set by an inverted pulse and reset by a non-inverted pulse. The flip flops FF20 to FF90 provide a memory of the count reached by the counter 109 at the time the counter 109 is reset.

When the AND gate 20 passes a pulse at the count 20, the flip flop 20 is set and an output appears on the Q lead designated Q 200–250. Since the counter is driven by pulses of 100 Hz, the time between successive pulses is 10 milliseconds and, therefore, the flip flop 20 is set at the count of 20 or approximately 200 milliseconds after the counting began. The flip flop 20 will remain set until a pulse passes through AND gate 25 to set flip flop 25 and reset flip flop 20. Accordingly, an output appears on the Q 200–250 lead starting at approximately 200 milliseconds after the start of the counting, and ends at approximately 250 milliseconds after the start of the counting. In a similar fashion, an output signal will appear on lead Q 250–300 during the 250 and 300 millisecond interval after the start of the counting. The designation of the output leads of the remaining flip flops convey corresponding intelligence. It was previously shown that a pulse through AND gate 107 and inverter 108 would reset the seven stage binary counter 109. It will also be seen that when flip flop FF90 is set, there will be an output signal on its Q lead which extends on lead Q900 to inverter 108 and resets the seven stage binary counter 109. Each time the seven stage binary counter 109 is reset, the output of the true/compliment buffer 110 is reset to zero and a pulse passes through AND gate 0 to the ST lead to change the setting of the toggle flip flop 111 which enables the other one of the pair of AND gates 112 and 113. It will be recalled that with AND gate 112 enabled, 100 Hz pulses will drive the counter 109, while with AND gate 113 enabled, 20K Hz pulses will drive the counter 109. From this, it may be seen that each time the counter 109 is reset, the toggle flip flop 111 is switched and the counter is driven alternately with 100 Hz and 20K Hz pulses. In the normal course of events, the counter will not count sufficiently far when driven by 100 Hz pulses to set flip flop FF90. The flip flop FF90 will be set only when the counter 109 is driven by 20K Hz pulses.

It will also be seen that the Q output of flip flop FF90 will switch toggle flip flop 201. With toggle flip flop 201 in one of its bi-stable positions, a signal will be placed through inverter 202 to the O/E lead to perform a function to be described more fully hereinafter. For the time being, it should merely be noted that each time the flip flop FF90 is set, the toggle flip flop 201 switches states.

Figure 3:
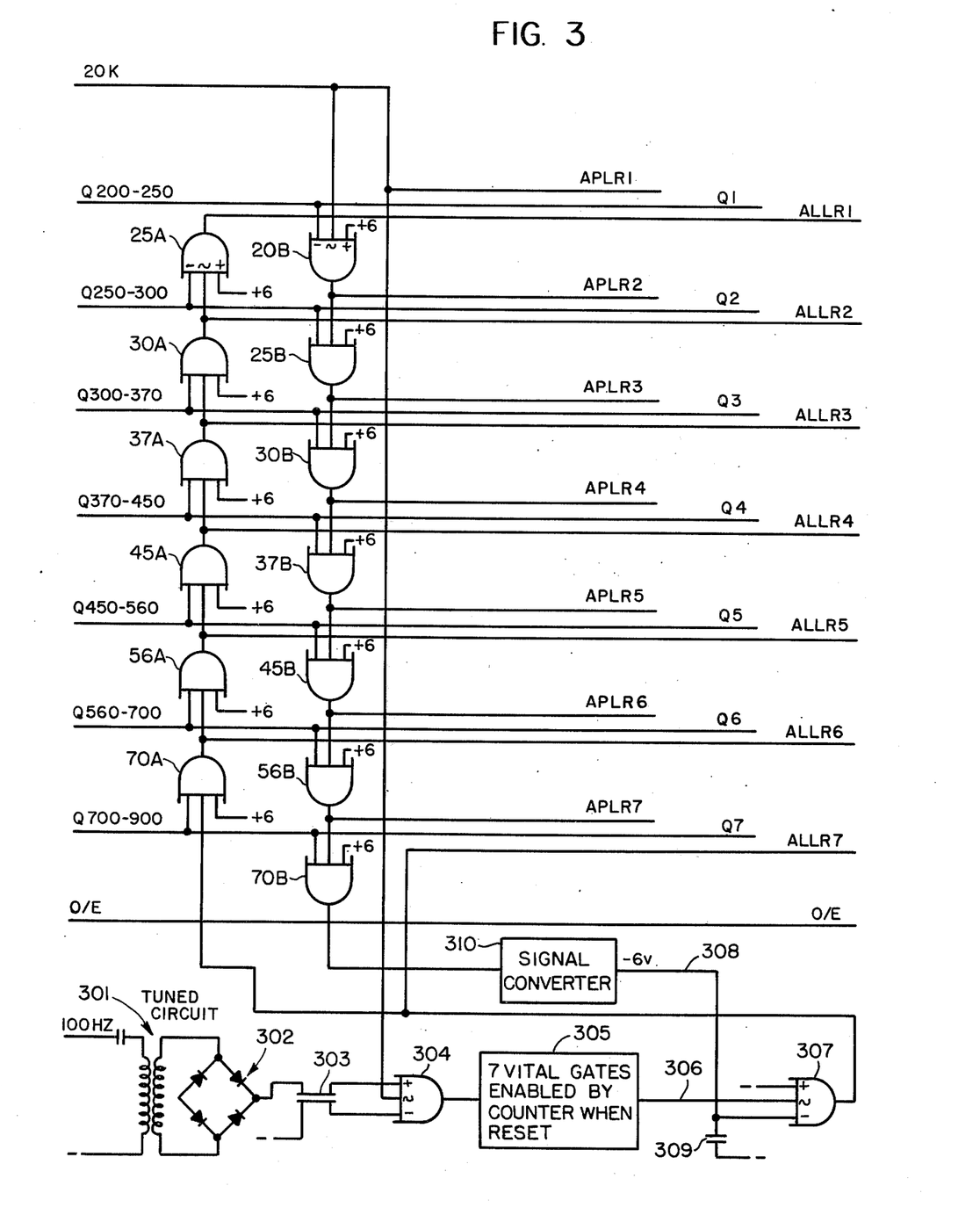
FIG. 3 provides two series of vital gates which are coupled to the output signals of the flip flops of FIG. 2 and provide signals to FIG. 4.

Considering now more specifically FIG. 3, there will be seen a tuned circuit 301 to which 100 Hz pulses are applied over lead 100 Hz from the pulse divider 105. If the 100 Hz signal is within predetermined limits of 100 Hz, a signal will pass through the tuned circuit 301 and produce an output from bridge 302. As long as there is an output from bridge 302, a charge will be maintained on capacitor 303 to enable AND gate 304. The signal input at the center terminal of AND gate 304 will be seen to be connected to the 20K Hz lead of the clock 104. Accordingly, 20K Hz pulses will pass through AND gate 304 as long as AND gate 304 is maintained enabled by the output of the bridge 302 which provides pass signal only when the 100 Hz signal is within predetermined frequency limits. The output of AND gate 304 is applied in series through seven vital gates which are enabled by the seven stage binary counter 109 only when that counter is reset. The seven vital gates are not shown in detail, but are represented by box 305. The enabling of such gates in response to the reset of a counter is an old and well established technique and is not shown herein in detail in order to simplify the drawing and place more emphasis on those portions of the circuit which play a more significant part in controlling the novel aspects of the structure. In any event, a signal can pass through the gates 305 only when the counter 109 is reset. The output pulse of the gates 305 is applied to lead 306 and, under conditions to be described more fully hereinafter, will pass through AND gate 307 and one or more other AND gates to perform a function to be described more fully hereinafter.

A vital AND gate is designed to assure no output unless it is fully enabled. That is, a vital AND gate is a failsafe device. Vital AND gates are graphically illustrated with symbols which have the lines of the dome extend past the line of the base.

FIG. 3 will be seen to include a first series of vital AND gates designated 25A, 30A, 37A, 45A, 56A and 70A. In addition, there is a second series of AND gates designated 20B, 25B, 30B, 37B, 45B, 56B and 70B. Each of these gates is seen to have +6 volts applied to the positive enabling terminal. The negative enabling terminal is seen to be one of the outputs of the flip flops FF20, FF25, FF30, FF37, FF45, FF56 and FF70. The numbering of the flip flops and AND gates are correlated so that, for example, flip flop FF45 provides an enabling or disabling connection to AND gates 45A and 45B. Note that the Q outputs of the flip flops of FIG. 2 are applied to the negative enabling terminal of the AND gates of FIG. 3. The Q outputs of the flip flops of FIG. 2 are positive while the flip flops are set, and negative when the flip flops are reset. Accordingly, a given flip flop of FIG. 2 provides an enabling signal to the corresponding AND gate of FIG. 3 when the flip flop is reset. If all of the flip flops of FIG. 2 are reset, all the AND gates of FIG. 3 with an A suffix will be enabled; and if AND gate 307 is enabled, pulses may pass therethrough and through all of the AND gates with an A suffix to the ALLR1 lead. If, for example, flip flop FF45 is set, its Q output lead will be positive and the AND gate 45A will not be enabled; and if 20K Hz pulse pass through AND gate 307, they can only go as far as through AND gate 56A to lead ALLR5. In a similar manner, 20K Hz pulses can pass through all of the AND gates of FIG. 3 which have a B suffix if all of the flip flops of FIG. 2 are reset.

If all of the flip flops of FIG. 2 are reset so that 20K Hz pulses can pass through all the AND gates of FIG. 3 having a B suffix, such pulses are applied to the signal converter 310 which applies a −6 volt signal to lead 308. The −6 volt signal on lead 308 is applied to timing capacitor 309 and charges it with the upper plate more negative than the lower plate which is connected to the negative terminal of the system power supply and which is the system ground. That is, terminals marked +6 are 6 volts positive with respect to terminals designated minus and terminals designated −6 are 6 volts negative with respect to terminals designated minus. With −6 volts applied to lead 308, the negative input of AND gate 307 is negative with respect to the positive input which is coupled to system ground and, therefore, AND gate 307 will be enabled. The capacitor 309 is a relatively large capacitor and once it is charged, will maintain a negative enabling potential on AND gate 307 for timing a period of time of approximately one second.

It is believed that a brief summary combined with some of the objectives of the system will make the description which follows more comprehensible. The system is designed to pick up a signal of an unknown code rate and time its successive cycles to determine the duration thereof. The system will provide a first unique response if the input signal has a period between 200 and 250 milliseconds. The system will provide another unique response if the input signal has a period between 250 and 500 milliseconds, and so on for other periods. The system provides for identifying the input signal as having a period falling within one of seven different ranges. A signal appears on one of the Q output leads of FIG. 2 which corresponds to the identified period of the input signal. Because the signal provides information for operating the train, care must be taken that there is no improper or dangerous operation of the train as a result of circuit malfunctions. Accordingly, before any action is taken in response to a detected signal, a variety of tests are made. For example, no action can be taken unless one of the memory flip flops of FIG. 2 was latched in the set position. Accordingly, the first test is: Is there a signal on any of the output leads of the flip flops of FIG. 2 indicating that at least one of them had been latched in set position. Since the flip flops of FIG. 2 are sequentially set and reset, a test is made when one flip flop is set to determine if the immediate prior flip flop had previously been set. Since only one flip flop of FIG. 2 should remain set, a test is made to be sure that all flip flops except one have been reset. In order to get an accurate time measurement of the unknown input signal, the counter must be reset to zero at the start of each cycle of the unknown signal. Accordingly, a test is made of proper counter reset. If the clock frequency is not correct, the elapsed time of a cycle of the unknown signal will not be accurately determined and the train should take no action under such circumstances. Accordingly, before an active signal is given to the train, the clock rate is verified. And finally, if things are to function properly, all the flip flops of FIG. 2 should be reset at the start of timing each cycle of the input signal.

Consideration will now be given to the operation of the train control circuit of FIG. 5 as the counter 109 advances from zero through successive counts. It should be born in the mind that there is a plurality of circuits identical to FIG. 5 and, more specifically, that there is a FIG. 5 for each of the flip flops FF20 to FF70 shown in FIG. 2. The ultimate objective is to operate the vital relay 501 in one of the train control circuits of FIG. 5 with an assurance that only one vital relay 501 is operated and that it is not actuated in response to a false signal, or under any conditions that could result from improper operation of associated circuits. Vital relays 501 are standard elements which have been used for many years. The vital relay 501 and its associated vital relay driver 502 function together to operate the vital relay 501 and maintain it operated only if the vital relay driver 502 receives periodic pulses of first one polarity and then the other within predetermined time periods. The bi-stable read relay 503 has contacts 504 which may be set to first one position then the other to provide pulses of alternate polarity to the vital relay driver 502. As drawn, the contacts 504 provide a positive potential signal to the vital relay driver 502; when the bi-stable reed relay 503 assumes its other bi-stable position, the contacts 504 will deliver negative potential, or system ground, to the vital relay driver 502. The bi-stable reed relay 503 will be seen to comprise first and second windings which are energized alternately. With one winding energized, the contacts 504 will assume the position illustrated, while with the other winding of bi-stable reed relay 503 energized, the contacts 504 will assume the other position. If the bi-stable reed relay 503 remains set in one position for more than a predetermined period of time, the vital relay driver 502 will not maintain the vital relay 501 operated. It will be recalled that in FIG. 2, there was a toggle flip flop 201 which was set to first one position and then the other in response to successive operations of the flip flop FF90. It will be seen hereinafter, that the output of the toggle flip flop 201 controls which winding of the bi-stable reed relay 503 is energized. The upper winding of the bi-stable reed relay 503 is energized when a −6 volt pulse is delivered from signal converter 505. In a similar manner, the lower winding of the bi-stable reed relay 503 is energized when the signal converter 506 delivers a −6 volt pulse to the lower winding of the bi-stable reed relay 503.

Figure 4:
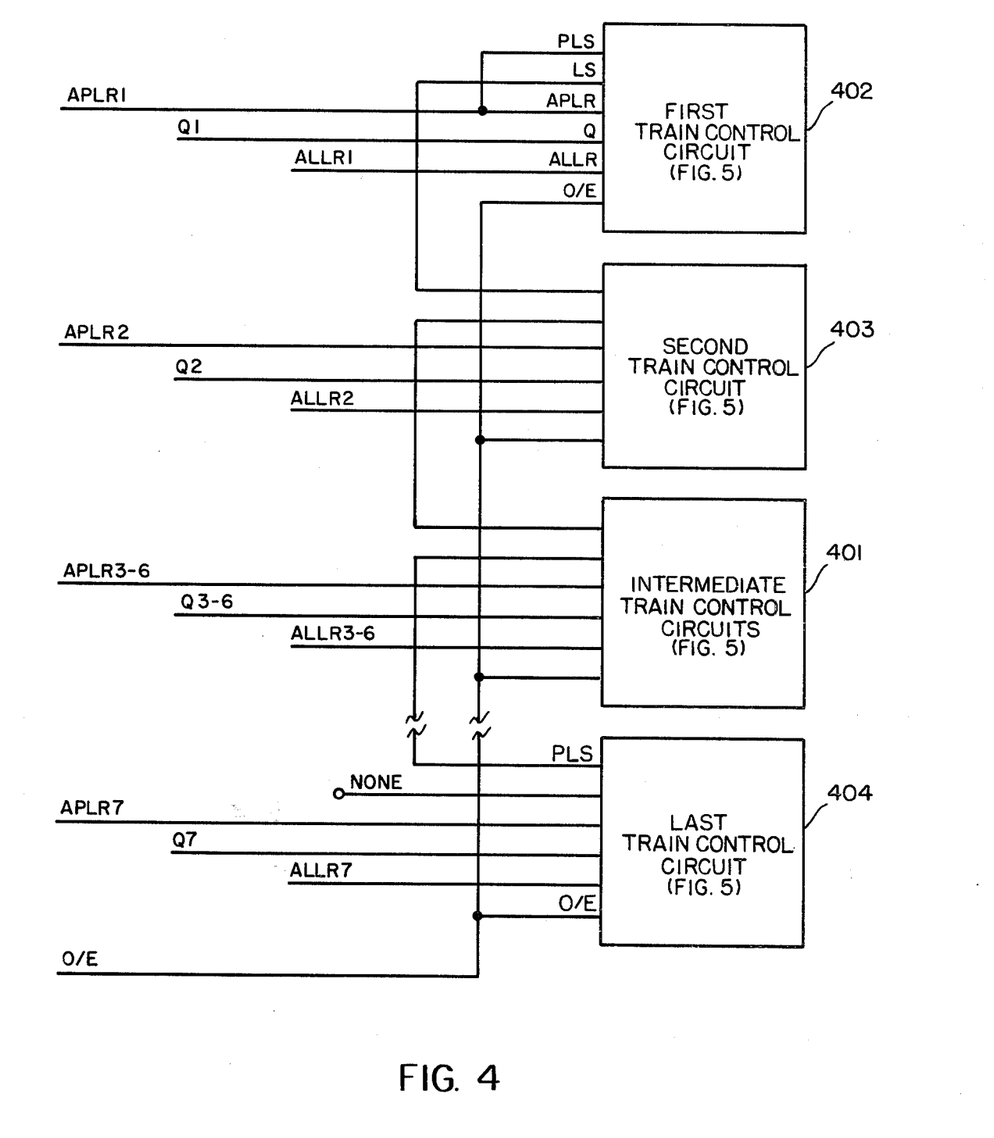
FIG. 4 illustrates the connections between the leads of FIG. 3 and a plurality of train control circuits according to FIG. 5.

Consider a time when the system is counting at the 100 Hz rate, but prior to the setting of any of the flip flops of FIG. 2. At this time, it will be observed that 20K Hz pulses are applied on the 20K lead of FIG. 3 to the APLR 1 lead extending to the box 402 representing the first train control circuit (FIG. 5) of FIG. 4 and thence to both the APLR lead and PLS lead of the first FIG. 5. The 20K Hz pulses on the PLS lead may pass through the OR gate 507, but will not pass through the vital AND gate 508 until AND gate 508 is enabled by a positive potential on the positive enabling lead, which is more positive than the +6 volts on the negative enabling lead of AND gate 508. The flip flops FF20 to FF70 of FIG. 2 apply a +12 volt potential to their respective output leads when the flip flops are set and provide a negative, or system ground, to their respective output leads when they are reset. Accordingly, while all the flip flops of FIG. 2 are reset and the negative system common is applied to all the output leads, the AND gates of FIG. 3 having A and B suffixes are all enabled, but the system ground on the Q lead to FIG. 5 does not enable AND gate 508. No further action can take place in the circuit of FIG. 5 until the AND gate 508 is enabled by the associated flip flop of FIG. 2 being set.

Consider now that the counter 109 has advanced sufficiently far to set the flip flop FF20 and apply a +12 volt signal to the lead Q 200–250 which extends into FIG. 3 and turns off AND gate 20B. The signal on the Q 200–250 lead extends through FIG. 3 to Q1 and thence to block 402 in FIG. 4 which represents the first train control circuit of FIG. 5. The 12 volt potential on the Q lead entering FIG. 5 provides an enabling potential to AND gate 508 since the positive input of AND gate 508 is more positive than the negative input of AND gate 508. With flip flop FF20 set and the AND gate 508 enabled, 20K Hz clock pulses will extend, as shown before, to the PLS lead of FIG. 5 and pass through OR gate 507, AND gate 508 and apply an input signal to the signal converter 509. In response to the application of an input to signal converter 509, it will produce at its output side a −6 volt potential which will be applied to the negative input of AND gates 510 and 511. This will enable the AND gates 510 and 511 as the negative input of these gates standing at −6 volts is now more negative than the positive input terminal which is at the system common potential. Examination of the box 402 in FIG. 4 will show that the 20K Hz pulses applied to the APLR 1 lead and which were extended to the PLS lead is also applied to the APLR lead to FIG. 5. Accordingly, 20K Hz pulses on the APLR lead pass through AND gate 510, OR gate 507 and AND gate 508 to signal converter 509, as long as AND gate 508 is enabled by the signal on the Q lead. The signal converter 509 maintains the AND gates 510 and 511 enabled. No pulse can appear on the ALLR lead to the first FIG. 5 as such pulse would have to pass through the seven vital gates 305 which path exists only when the counter 109 is reset. Accordingly, no further action takes place within the circuit of FIG. 5.

As the counter 109 advances to count 25, flip flop FF25 will be set and flip flop FF20 will be reset. The setting of flip flop FF25 will extend a 12 volt signal on the lead Q 250-300 to turn off AND gates 25A and 25B and extend a 12 volt pulse on lead Q2 to the box 403 of FIG. 4 which represents the second train control circuit (FIG. 5). The 12 volt pulse on the Q lead of the second FIG. 5 will enable the AND gate 508 of the second FIG. 5. The signal generator 509 of the first FIG. 5 maintains a −6 volt output for a few milliseconds after the enabling of the AND gate 508 of the first FIG. 5 is removed. Accordingly, the 20K Hz pulses on the APLR lead to the AND gate 510 of the first FIG. 5 extends therefrom on the LS, latch set, lead out of the first FIG. 5, shown in box 402, to the PLS lead of the second FIG. 5 shown in box 403. The 20K Hz pulses enter the second FIG. 5 on the PLS lead and pass through OR gate 507 and AND gate 508 to the signal converter 509, all in the second FIG. 5. The −6 volt output of the signal converter 509 in the second FIG. 5 enables AND gates 510 and 511. With flip flop FF20 reset, the Q 200-250 lead returns to system common potential and AND gate 20B is enabled. Accordingly, 20K Hz pulses can pass through AND gate 20B to the APLR 2 lead to pass 20K Hz pulses through AND gate 510 of the second FIG. 5. The 20K Hz pulses through AND gate 510, will pass through OR gate 507, AND gate 508, and signal converter 509 to maintain AND gates 510 and 511 enabled. The fact that this sequence of events could occur, is proof that flip flop FF20 was reset. If flip flop FF20 had failed to reset, the gate 20B would not have been enabled and 20K Hz pulses would have been applied to the APLR 2 lead to pass through the AND gate 510 of the second FIG. 5. It will now be evident that the mnemonic meaning of the APLR is All Prior Latches Reset, where the word latches refers to the latching flip flops of FIG. 2.

As the count continues, the flip flop FF30 will be set and flip flop FF25 reset. This will cause the next FIG. 5 to function in substantially the same manner as that described with respect to the second FIG. 5. Note that before a signal on a Q lead to a FIG. 5 can pass through AND gate 508, there must first be a signal on the PLS lead indicating that the prior latch had been set immediately prior to the appearance of the enabling potential on the Q lead. That is, a FIG. 5 with an enabling potential on the Q lead should be receiving 20K Hz pulses on the APLR lead as long as all prior latches are reset. And when the enabling potential is applied to the Q lead of the next FIG. 5, the AND gates 510 and 511 of the prior FIG. 5 remain enabled for a few milliseconds and 20K Hz pulses pass through the gate 510 of the prior FIG. 5 and out the LS lead to the PLS lead of the next FIG. 5 to pass through the OR gate 507 thereof and the just enabled AND gate 508. Accordingly, as the count progresses, no circuit of FIG. 5 can function unless the immediate prior circuit had functioned.

Circuit Actuation With an Input Pulse Having a Period of Approximately 500 Milliseconds It will be assumed that the pulse applied to lead 101 has a period of approximately 500 milliseconds. This means that for each period of the signal applied to lead 101, the counter will be able to count to approximately 50, which is 50 pulses of the 100 Hz signal which are, of course, 10 milliseconds apiece. It will be recalled that at the start of each cycle on lead 101, the counter 109 will be reset. Accordingly, for each successive cycle, the counter will count to 50 and the flip flop FF45 will be set at the end of each cycle of the signal on lead 101. With the flip flop FF45 set, the train control circuit of FIG. 5 associated with flip flop FF45 will have its AND gates 510 and 511 enabled. That is, a first control signal appears on the Q lead to the train control circuit to enable AND gate 508. This enables a second control signal from the LS lead of the prior train control circuit to be applied to the PLS lead and activate signal converter 509 and enable AND gates 510 and 511. With flip flops FF45 set, the AND gate 45B is turned off and 20K Hz pulses may pass through AND gates 20B, 25B, 30B and 37B to apply a third control signal on the APLR5 lead to the train control circuit 401. As soon as the counter 109 is reset from the end of the input cycle signal on lead 101, the counter 109 will count at high speed in the manner previously described and be reset again in response to reaching the count of 90. During the high speed count, each of the flip flops of FIG. 2 will be reset and, therefore, all of the AND gates of FIG. 3 having a suffix B will be enabled and 20K Hz pulses can pass through them to the signal converter 310 which will apply a −6 volt voltage on lead 308 to enable AND gate 307. 20K Hz pulses will continue to pass through the AND gates of FIG. 3 having the suffix B for approximately 200 milliseconds; that is, until flip flop FF20 is set at the count of 20. Accordingly, the −6 volt potential is maintained on the capacitor 309 for approximately 200 milliseconds; and the charge on that capacitor will maintain AND gate 307 enabled for a timed period of approximately one second. The counter will again cycle through at 10 milliseconds per count and set the flip flop FF45. At the end of this pulse of the input signal on lead 101, the counter 109 will be reset. At this time, if the 100 Hz signal is of the right frequency, it will pass through the tuned circuit 301 in the manner previously described to enable AND gate 304. With AND gate 304 enabled, 20K Hz pulses will pass through AND gate 304 and the seven vital gates 305 and thence on lead 306 through enabled AND gate 307 and through AND gates 70A and 56A to place a fourth control signal on the lead ALLR 5. This signal will pass through the enabled AND gate 511 of the appropriate FIG. 5 and one or the other of the AND gates 512 and 513, one of which is enabled by a potential on the O/E lead. For the present, it will be assumed that the AND gate 512 is enabled and the fourth control signal on the ALLR5 lead passes through AND gates 511 and 512 to the signal converter 505. As previously described, this will energize one winding of the bi-stable relay 503 and cause a pulse of energy through the upper winding of the vital relay 501. It should be noted that the pulse just described on the ALLR5 lead, which resulted in energizing the vital relay 501, existed only during the time that the counter 109 was in the reset condition. This condition persists only for approximately 10 milliseconds. That is, as soon as the counter responds to the first 100 Hz pulse, the counter will no longer be reset and the 20K Hz signals cannot be gated through the gates 305. Pulses will continue as before and the flip flops of FIG. 2 will be sequentially set and reset until at the end of the cycle of the signal on lead 101, the flip flop FF45 remains set. As before, the counter is reset and the toggle flip flop 111 is changed and the counter 109 counts at high speed. At the end of the high speed count, the toggle flip flop 201 is changed to change the signal on the O/E lead and provide a fifth control signal to the train control circuit and enable AND gate 513 and disable the AND gate 512. Accordingly, next time pulses appear on the ALLR5 lead of train control circuit 401, they will pass through enabled AND gates 511 and 513 to the signal converter 506 to activate the other winding of the bi-stable reed relay 503 and cause a pulse of energy to be placed through the lower winding of the vital relay 501. In this manner, alternate windings of the vital relay 501 are energized in response to the detection of successive cycles of the signal on lead 101. The application of pulses to the lead ALLR is an indication that all of the flip flops after FF45 have been reset, as otherwise the signal could not have passed through the AND gates 70A and 56A. Operation of the vital relay 501 causes its contacts 521 to issue a train command signal.

SUMMARY OF THE INVENTION

From the foregoing, it has been shown that a vital relay 501 can be operated only if one of the flip flops of FIG. 2 remain set at the end of the input pulse. That is, if the desired flip flop and any prior flip flop has both remained set, pulses could not have gotten through an appropriate AND gate with a suffix B in FIG. 3 to apply a signal to a required APLR lead.

Figure 5:
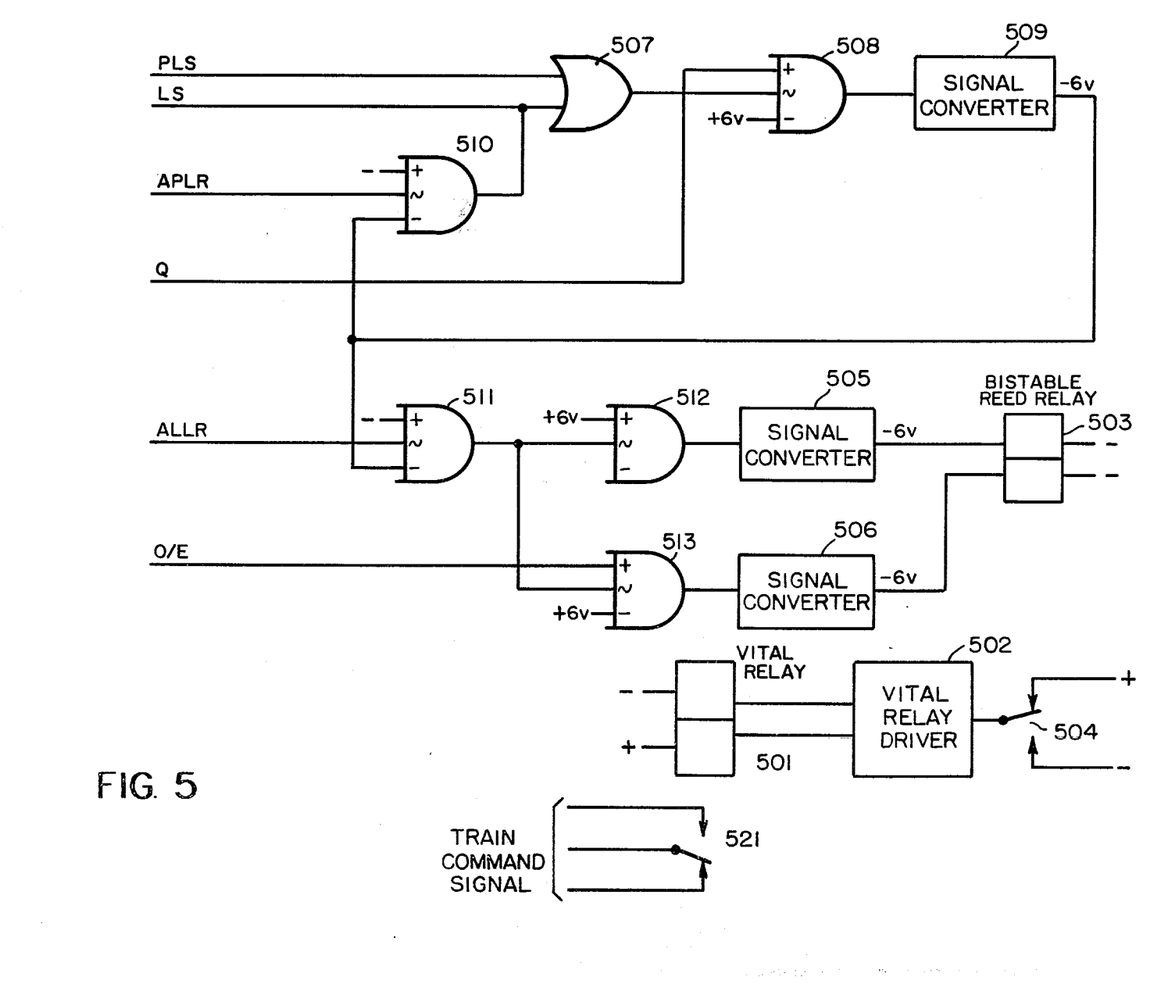
FIG. 5 illustrates the train control circuit and the associated vital relay.

A test was made that the flip flops of FIG. 2 were functioning sequentially because no FIG. 5 circuit can function unless the prior FIG. 5 circuit provides a signal indicating that it had functioned. The first FIG. 5 is, of course, an exception. Since there is no prior FIG. 5 to the first FIG. 5, as represented by box 402, it is given a signal that the prior FIG. 5 had functioned by applying 20K Hz pulses to the PLS, Previous Latch Set, lead. Since the last FIG. 5 as represented by box 404 does not have any subsequent FIG. 5, its latch set lead LS has no connection. And since there is no subsequent FIG. 5's, there is no need to test that they have been reset and, therefore, the ALLR lead from the last FIG. 5 is coupled directly to the output of AND gate 307 without the need to pass through any AND gate having a suffix A.

The testing that all prior latches and all previous latches are reset, provides a test that only one of the flip flops of FIG. 2 remained set when the counter 109 was returned to zero at the end of the cycle of the signal on the lead 101. The AND gates 305 provide a test that the counter 109 does reset to zero.

The tuned circuit 301 tests the clock rate by testing the frequency of the 100 Hz signal which is derived from the clock pulses.

The pulse that activates the signal converter 310 must pass through all the AND gates with the suffix B and, therefore, this provides a signal that all of the flip flops of FIG. 2 had been reset at an appropriate time.

By means of the tests summarized above, adequate safeguards are provided to prevent inadvertent actuation of any vital relay 501.

While there has been shown and described what is considered at the present to be the preferred embodiment of the invention, modifications thereto will readily occur to those skilled in the related arts. For example, a different number of stages could be used as may be required. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A train control system for causing a train to respond in a predetermined manner to signals of predetermined cycle durations, as received on-board the train from the wayside, and having on on-board decoder which includes counting means for sensing the time duration of cycles of the received signal and wherein further on-board means is provided for checking the operation of the decoder comprising:
   a. a counter for counting uniform intervals of elapsed time;
   b. counter control means for activating said counter at a first rate in response to the start of a cycle of a received signal and for resetting said counter at the end of the cycle;
   c. a plurality of elapsed time memory devices sequentially activated in response to said counter being advanced to predetermined counts indicative of successively larger intervals of elapsed time as measured from the start of the received signal which activated said counter;
   d. control means coupling said memory devices for deactivating a previously activated memory device when a successive memory device is activated; and
   e. verifying means for determining that only one of said memory devices is activated before said train is caused to respond to the decoded signal.

2. The train control system as set forth in claim 1 and including a train control circuit associated with each of said memory devices.

3. The train control system as set forth in claim 2, wherein each of said memory devices passes a first control signal to its associated train control circuit when the memory device is activated.

4. The train control system as set forth in claim 3, wherein each train control circuit passes a second control signal to the successive train control circuit only when;
   a. the enabling train control circuit had responded to said first control signal; and
   b. the memory device associated with the enabling train circuit is deactivated.

5. The train control system as set forth in claim 4, wherein said verifying means comprises:
   a. first and second series of AND gates with each AND gate associated with, and controlled by, a predetermined one of said memory devices.

6. The train control system as set forth in claim 5, wherein said verifying means further comprises sampling means for sampling the frequency of the pulses that activate said counter at said first rate and for producing a pass signal when the sampled pulses are within a predetermined frequency range.

7. A train control system as set forth in claim 6, wherein an AND gate, from said second series of AND gates, associated with the memory device preceeding the activated memory device passes a third control signal to the train control circuit associated with said activated memory device.

8. The train control system as set forth in claim 7 and wherein an AND gate, from said first series of AND gates, associated with the memory device succeeding the activated memory device passes a fourth control signal to the train control circuit associated with said activated memory device in response to the reset of said counter at the end of said cycle.

9. The train control system as set forth in claim 8, wherein said fourth control signal is produced in response to the production of said pass signal.

10. The train control solution as set forth in claim 9 and including a timing circuit for enabling said fourth control signal to be passed to a train control circuit only within a predetermined time period subsequent to the deactivation of all of said memory devices.

11. The train control system as set forth in claim 10, wherein a said train control circuit responds to receipt of said first, second, third and fourth control signals by activating a train command signal device.

12. The train control system as set forth in claim 11, wherein said train command signal device comprises a vital relay which has first and second coils which must be activated alternately and periodically to maintain it operated.

13. The train control system as set forth in claim 12 and including a bi-stable toggle memory activated by successive cycles of said counter to pass a fifth control signal to said train control circuit for causing said train control circuit to direct alternate fourth control signals to activate said first coil of said vital relay and to direct intermediate fourth control signals to activate said second coil of said vital relay.

14. The train control system as set forth in claim 1 and including a bi-stable toggle memory coupled to said counter and responsive to a reset operation of said counter for gating signals of said first rate to said counter when said bi-stable toggle memory is in one of its stable states and for gating signals of a second rate, which is a multiple of said first rate, to said counter when said bi-stable toggle memory is in its other stable state whereby said counter is alternately driven at said first and second rates.

15. The train control system as set forth in claim 14, wherein said elapsed time memory devices include an ultimate memory device which, when activated by said counter advancing to a predetermined count, provides a counter reset signal.

16. The train control system as set forth in claim 15 and including a train control circuit associated with each of said memory devices except said ultimate memory device.

17. The train control system as set forth in claim 16, wherein each of said memory devices passes a first control signal to its associated train control circuit in response to the activation of the memory device.

18. The train control system as set forth in claim 17, wherein a train control circuit passes a second control signal to the successive train control circuit in response to the deactivation and activation of the memory devices associated with the enabling and successive train control circuits, respectively.

19. The train control system as set forth in claim 18, wherein in response to the deactivation of one memory device and the activation of the successive memory device, a third control signal is passed to the train control circuit associated with the activated memory device.

20. The train control system as set forth in claim 19, wherein said verifying means further comprises sampling means for sampling the frequency of the pulses that activate said counter at said first rate and for producing a pass signal when the sampled pulses are within a predetermined frequency range.

21. The train control system as set forth in claim 20, wherein a fourth control signal is passed to the train control circuit associated with the activated memory device in response to the resetting of said counter at the end of the cycle and the production of said pass signal.

22. The train control system as set forth in claim 21, wherein a fifth control signal is passed to said train control circuits in response to the activation of said ultimate memory device.

23. The train control system as set forth in claim 22, wherein a said train control circuit generates a train command signal in response to the receipt of said first, second, third and fourth control signals.

24. The train control system as set forth in claim 23, wherein said generated train command signal comprises a pulse having a period which exceeds the maximum predetermined cycle duration as received on board the train.

25. The train control system as set forth in claim 24, wherein said generated train command signal pulse is maintained for a similar period in response to the reactivation of the said train control circuit by said first, second, third and fourth control signals together with said fifth control signal.

* * * * *